United States Patent
Nay et al.

(10) Patent No.: US 7,179,855 B2
(45) Date of Patent: Feb. 20, 2007

(54) POLYAMIDE MOLDING COMPOSITIONS CONTAINING PREPOLYMERIC POLYAMIDES, A METHOD FOR THE PREPARATION THEREOF AND THE USE THEREOF

(75) Inventors: Renato Nay, Masein (CH); Manfred Hewel, Rodels (CH)

(73) Assignee: EMS - Chemie AG, Ems (CH)

( * ) Notice: Subject to any disclaimer, the term of this patent is extended or adjusted under 35 U.S.C. 154(b) by 63 days.

(21) Appl. No.: 10/307,770

(22) Filed: Dec. 2, 2002

(65) Prior Publication Data

US 2003/0158308 A1    Aug. 21, 2003

Related U.S. Application Data

(63) Continuation-in-part of application No. 09/311,037, filed on May 13, 1999, now abandoned.

(30) Foreign Application Priority Data

May 14, 1998 (DE) ............................... 198 21 719

(51) Int. Cl.
C08J 3/00      (2006.01)
C08K 5/20      (2006.01)
C08L 23/00     (2006.01)
C08L 77/00     (2006.01)
C08L 79/00     (2006.01)

(52) U.S. Cl. .................... 524/227; 428/35.7; 428/35.8; 428/36.8; 428/36.9; 428/36.92; 524/210; 524/439; 524/606

(58) Field of Classification Search ................ 524/230, 524/606, 210, 227, 439; 428/35.7, 35.8, 428/36.8, 36.9, 36.92
See application file for complete search history.

(56) References Cited

FOREIGN PATENT DOCUMENTS

| EP | 272695 | * | 6/1998 |
| JP | 05 194 841 | | 8/1993 |
| JP | 05 214 246 | | 8/1993 |
| JP | 09 134 812 | | 5/1997 |
| JP | 09 148 113 | | 6/1997 |

OTHER PUBLICATIONS

Franz Fourne, Synthetische Fasern, Herstellung, Maschinen und Apparate, Eigenschaften Handbuch fur Anglagenplanung, Maschinenkonstruktion und Betrieb.
English Translation of relevant material (Table 2.3 and picture 2.9 attached hereto.

* cited by examiner

*Primary Examiner*—Patrick D. Niland
(74) *Attorney, Agent, or Firm*—Marshall & Melhorn, LLC

(57) ABSTRACT

The invention concerns polyamide molding compositions with good surface quality and good flow behavior containing prepolymeric polyamides with a solution viscosity of μrel 1.01–1.30 in quantities from 0.1 to 20 wt. %.

11 Claims, No Drawings

POLYAMIDE MOLDING COMPOSITIONS CONTAINING PREPOLYMERIC POLYAMIDES, A METHOD FOR THE PREPARATION THEREOF AND THE USE THEREOF

CROSS-REFERENCE TO RELATED APPLICATIONS

This application is a continuation-in-part application of application Ser. No. 09/311,037, filed on May 13, 1999 now abandoned application Ser. No. 09/311,037 was pending as of the filing date of the present application. Application Ser. No. 09/311,037 is hereby incorporated by reference as if set forth in its entirety herein.

BACKGROUND OF THE INVENTION

1. Field of the Invention

The invention concerns polyamide molding compositions and a method for the preparation thereof with greatly improved processability, flow paths and surface quality, without loss of strength or thermal stability, a method for the preparation thereof and use thereof, for the manufacture of molded bodies such as fibers, sheets, pipes, hollow bodies or other half-finished or products e.g. by extrusion, pultrusion, injection molding, injection blow-molding or other shaping techniques.

The invention is characterized in that quantities of up to 20 wt. % of the polyamide matrix of prepolymers of the same or different polyamides are incorporated into the polyamide molding compositions, resulting in a great improvement in flowability and mold removal behavior as well as surface quality without strength and thermal stability being reduced. The polyamide molding compositions according to the invention mainly concern those which are provided with reinforcing agents of all kinds or certain additives, but also molding compositions which contain no additives. The invention further concerns the use of the molding composition.

2. Description of the Prior Art

Additives are known for improving the processability of polyamide molding compositions for extrusion or injection molding. Thus amides or urea derivatives are proposed as an additive for improving the flow properties as well as given amides, diamides or imides.

For this purpose the addition of silicone oils, stearic acid or calcium or zinc salts thereof or long-chain aliphatic esters and alcohols is described as well.

But these additives often have the drawback that they impair the quality of the polyamide molding compositions by the fact that they have a tendency to exudation i.e. migration or also smoke formation during processing or are extracted out by solvents or form streaks and spots or cause a reduction of molecular weight and so lower strength, rigidity and thermal dimensional stability and the like (Nylon Plastics Handbook, Melvin I. Kohan, pages 436–440).

Also it is known that various additives can be incorporated to improve the surface gloss. Here the use of polyhexamethylene adipic acid amide or polyhexamethylene isophthalic acid amide with a viscosity of 1.5–2.8 (1% in sulphuric acid) in combination with copper, iodine or manganese salts or the addition of polyphenyl ether may be mentioned. On the other hand resin materials from polyamides with good surface gloss with a greatly increased proportion of inorganic fillers were also developed. To increase strength and rigidity the use of terephthalic acid and isophthalic acid in polyamide resins is proposed. However it is difficult to make molded bodies with satisfactory surface quality from them, because they exhibit poor flowability.

Likewise the improvement of thermal stability of molding compositions is known. In DE 4 311 885 additions of alkali salts of oxalic, malonic, glutaric or phthalic acid are recommended for this purpose.

But here it is necessary, for the simultaneous improvement of several important properties of the polyamide molding compositions such as flow behavior, gloss, strength and thermal stability, to use additives of different kinds. But these additives on the one hand are not always compatible with each other, and on the other hand they often impair important additional properties such as the toughness, the flexibility, the braking elongation, the stress cracking resistance, etc.

In EP 0 272 695 are described high-impact-strength, multiphase, thermoplastic polyamide mixtures which are provided with 10–40 wt. % of impact strength modifiers of the type EP, EPDM, SEBS, SBS, SAN and the like and, in addition to the high-molecular polyamide, also contain a proportion of lower molecular polyamide units to improve processing. The lower-molecular polyamide has the function of lowering the higher viscosity caused by impact strength modification again and so making the molding compositions more processable; it has a high unbalanced terminal group content, a mean molecular weight of <5,000 and an inherent viscosity of <0.5 dl/g, so that the polyamide mixture finally achieves a resulting viscosity of 5–50 Pa.s (50–500 poise) or a fusion of 100→200 g/10 minutes at 280° C. and 2160 g load according to ASTM D 1238.

The method described is elaborate as it requires two extrusion steps and is unsatisfactory insofar as the polyamide moldings manufactured often turn out stained particularly at higher concentrations of the foreign-polymer impact strength modifiers and exhibit streaks in the case of larger moldings, moreover the low-molecular polyamide reacts unevenly with the high-molecular polyamide due to partial postcondensation and transamidation, as a result of which great fluctuations in viscosity can arise.

An additional feature of the EP 0 272 695 reference is the inclusion of 10–40% of an impact strength modifier, and additionally, a lower molecular polyamide to improve processing. The present invention, does not need these impact strength modifiers as does the EP 0 272 695 reference, and in fact, can achieve superior properties (e.g. tensile strength, elongation and E-modulus) than does the EP 0 272 695 reference. These superior results are identified below, in tables 1–3 reflecting the present invention, and table 4, a comparative example reflective of the Epstein reference.

EP 0 553 617 discloses polyamide molding compositions with a high content of fillers in which the fillers are mixed in the melt with a low-molecular polyamide with a viscosity number of 40–80 ml/g (measured at 25° C. in 0.5% $H_2SO_4$ 96%) and are brought to higher viscosities in the solid phase by a separate postcondensation step. The lower-molecular polyamide is intended to have a terminal group content which is equimolar as far as possible and not too high. This method has the drawback that two work stages are necessary and high fluctuations in final viscosity must be expected, as a result of which moldings often turn out rough, stained and streaky, and postcondensation is time-consuming and gives rise to defective processability of the molding compositions.

SUMMARY OF THE INVENTION

It is an object of the present invention to provide filled and unfilled polyamide molding compositions for moldings, which allow particularly good surface quality, high surface gloss and very good flow properties. Moreover the polyamide molding compositions according to the invention should not impair, but improve important properties of the finished products such as the strength, the rigidity and thermal dimensional stability, furthermore higher quantities of filler than usual should be capable of being incorporated as well. It is a further object of the invention to provide a corresponding method for the preparation of such molding compositions and the use thereof.

The subject of the present invention therefore lies in that additional proportions of prepolymeric polyamides of given viscosity are incorporated into the polyamide molding compositions.

The polyamide molding compositions according to the invention can consist-of one or more polyamides and also the added prepolymeric polyamides can be of the same type as the polyamide matrix of the molding compositions or derived from different polyamide types.

According to the invention the molding compositions which contain the prepolymeric polyamides extend to all polyamides, crystalline as well as amorphous or mixtures thereof. A survey of polyamides can be found e.g. in Römpp Chemie-Lexikon, 9th edition, volume 5, page 359 ff. and the citations mentioned therein. But the polyamides PA 6, PA 66, PA 11, PA 12, PA 6T/66, PA 6T/6I, PA 6I/6T, PA 6/6T, PA 6/66, PA 8T, PA 9T, PA 12T, PA 69, PA 610, PA 612, PA 1012, PA 1212, PA MACM12, PA PACM12, PA MACMT, PA PACP12, PA NDT, PA MXDI, PA NI, PA NT, PA TMHMDAT, PA 12/PACMT/ PACMI, PA 12/MACMI/ MACMT, PA N12, PA 6/MACMI are preferred. The same applies to the prepolymers used in the polyamides. The invention therefore also extends for the prepolymers to all the above-mentioned polyamides.

The viscosity of the added prepolymeric polyamides is around 1.01–1.3 measured in 0.5% m-cresol, preferably around 1.05–1.25. The molding compositions in this case contain 0.1–20 wt. % prepolymers referred to the polymer matrix, particularly preferably 2–18 wt. %. The best results are obtained with 2–16%.

The polyamide molding compositions preferably contain fillers in quantities of 1–95 wt. % such as glass fibers, glass balls, glass powders, polymer fibers, carbon fibers, metal fibers, minerals such as talcum, lime, kaolin, silicates, flameproofing agents such as hydroxides, phosphates, halogen-containing substances, decorating agents, stabilizers, catalysts, also additives such as crystallizing agents, lubricants, antioxidants, etc. but can also occur as pure polyamides without additives.

The invention further concerns a method for the preparation of the polyamide molding compositions described above. For preparation of the polyamide molding compositions according to the invention, the prepolymeric polyamides of given viscosity are incorporated into the polyamides. This can be done by the fact that the prepolymers are added dry and then processed in the melt or are added in kneading or screw machines in the course of compounding the molding compositions or powdered on or rolled on during injection-molding processing. The prepolymeric polyamide fractions are added as powder or hard granular material or pasty product possibly mixed with high-molecular polyamide and in quantities of 0.1–20 wt. % referred to the polyamide matrix, preferably in quantities of 2–18 wt. %, further preferably of 2–16 wt. %. The processing temperature is 160–380° C., preferably 180–350° C.

Suitable machines for incorporating the prepolymeric polyamide fractions into the polyamide molding compositions are single-shaft and twin-shaft extruders, kneading machines, injection-molding machines and the like.

The prepolymeric polyamide fractions added to the high-molecular polyamide molding compositions on the one hand cause a clear decrease in viscosity of 100% or more depending on the quantity of prepolymeric polyamide added, so that the MVI initial value of the molding compositions of about 10–100 ml/10 min can increase by a multiple, also depending on the type of polyamide. As a result higher filler quantities of up to 95 wt. % are possible, because these are better wetted by the prepolymeric polyamides and so can be bound in the polyamide matrix better.

On the other hand by this method also the flow path of the polyamide molding compositions is increased extraordinarily, sometimes by a multiple of the initial value, so that much finer and thinner but also larger-area moldings can be manufactured.

Likewise the surface quality of finished products is greatly improved, which due to fillers often appears rough and stained or shows indentations and irregularities. Addition of the prepolymeric polyamide fractions causes a smoother, more even surface of the moldings and gives them a high gloss.

Another advantage lies in that the prepolymeric additives do not migrate, as softening foreign substances or lubricants often do, or form coatings on the surface or lower the mechanical properties or the thermal dimensional stability, but assist these on account of the related polymeric structure, and in many cases even improve them.

Finally the invention also concerns the use of the polyamide molding-compositions as described above. The molding compositions according to the invention are used particularly for the manufacture of molded bodies such as fibers, sheets, pipes, hollow bodies or other half-finished or finished products e.g. by extrusion, pultrusion, injection molding, injection blow-molding or other shaping techniques. Preferably the molding compositions are used for the manufacture of filled moldings.

It is important to note that a feature of the present invention is that the desired properties can be achieved without the use of an impact strength modifier or, in other words, without the use of impact strength modifying agents or tougheners. This is reflected in the admixture of a prepolymer with a specific viscosity. The admixture of the prepolymer causes a clear decrease in viscosity of 100% or more. Through this feature it is possible to produce polyamides with high (up to 95%) filler quantities, with no or essentially no impact strength modifiers included.

BRIEF DESCRIPTION OF THE PREFERRED EMBODIMENT

The examples below illustrate the polyamide molding compositions according to the invention:

The $\mu$rel values were determined according to DIN 53727, the MVI (melt volume index) according to ISO 1133 (DIN 53735) and the gloss values with a Minolta Multigloss 268 device according to ISO 2813 (DIN 67530) and the flow length was determined by a spinal test (flow path spiral 1.5×10) according to the internal standard of EMS-Chemie AG.

EXPLANATIONS OF THE EXAMPLES

The polyamide prepolymers were incorporated into the polyamides, together with glass fibers, on a twin-shaft extruder ZFK 25 from the firm Werner & Pfleiderer under the usual conditions for polyamide. The string drawn off was cooled, granulated and dried. Then the granulate is processed on an A270 injection molding machine from the firm Arburg to form samples for determining the subsequent mechanical properties and flow path. The flow path was determined on a spiral $1.5^2 10$ mm at 1000 bars pressure and processing temperatures and molding temperatures normal for the respective polyamides.

| Explanations of terms for the following tables | |
| --- | --- |
| PA66 + PA 6I/6T = | blend of polyamide 66 and a copolyamide 6I/6T |
| glass fibers = | cut glass from the firm Vetrotex (type P355) |
| prepolymer PA 6T/6I = | polyamide 6T/6I η-rel. 1.14 measured 0.5% in m-cresol |
| PA 66 = | polyamide 66 |
| PA 12 = | polyamide 12 |
| prepolymer PA 12 = | polyamide 12 η-rel. 1.10 measured 0.5% in m-cresol |
| PA MACM 12 = | transparent polyamide MACM 12 |
| n.b. | no breaking |

TABLE 1

(examples 1–4)

| | |
| --- | --- |
| example 1 = | comparative example without prepolymeric addition |
| examples 2–4 = | examples with prepolymeric addition of 2–8 wt. % referred to the total mixture and 4–16 wt. % referred to the polyamide blend. |

TABLE 2

(examples 5–6)

| | |
| --- | --- |
| example 5 = | comparative example without prepolymeric addition |
| examples 6–7 = | examples with prepolymeric addition of 2–4 wt. % referred to the total mixture and 4-wt. % referred to the polyamide. |

TABLE 3

(examples 8–10)

| | |
| --- | --- |
| example 8 = | comparative example without prepolymeric addition |
| examples 9–10 = | examples with prepolymeric addition of 2–4 wt. % referred to the total mixture and 4–8 wt. % referred to the polyamide. |

TABLE 4

(examples 11–14)

| | |
| --- | --- |
| examples 11, 13 = | comparative example without prepolymeric addition |
| examples 12, 14 = | examples with prepolymeric addition of 2–4 wt. % referred to the polyamide. |

TABLE 1

| Formulation of examples | | | 1 | 2 | 3 | 4 |
| --- | --- | --- | --- | --- | --- | --- |
| PA66 + PA 6I/6T | | | 50% | 48% | 46% | 42% |
| Glass fibers | | | 50% | 50% | 50% | 50% |
| Prepolymer PA6T/6I η-rel. 1.14 | | | | 2% | 4% | 8% |
| Total | | | 100% | 100% | 100% | 100% |
| Prepolymer fraction referred to polyamide | | | 0% | 4% | 8% | 16% |
| Properties | Standard | Unit | | | | |
| Flow path | EMS | mm | 169 | 229 | 271 | 367 |
| Gloss 20° | DIN 7530 | — | | 28 | 31 | 32 | 33 |
| Gloss 60° | DIN 7530 | — | | 67 | 71 | 76 | 76 |
| MVI 290° C./5 kg | ISO 1133 | cm$^3$/10 min | 26 | 55 | 69 | 87 |
| η-rel. 0.5% m-cresol | DIN 3727 | — | | 1.76 | 1.62 | 1.54 | 1.45 |
| Impact strength | ISO 179 | kJ/m$^2$ | 90 | 94 | 90 | 85 |
| Notched bar impact strength | ISO 179 | kJ/m$^2$ | 13 | 13 | 13 | 16 |
| Tear Resistance | ISO 527 | MPa | 220 | 230 | 235 | 236 |
| Elongation at tear | ISO 527 | % | 2.6 | 2.5 | 2.3 | 1.9 |
| Modulus of elasticity in extension | ISO 527 | Mpa | 15900 | 16000 | 16200 | 16500 |
| HDT A | ISO 75 | °C. | 240 | 240 | 240 | 240 |
| HDT C | ISO 75 | °C. | 160 | 165 | 179 | 192 |

TABLE 2

| Formulation of examples | | | 5 | 6 | 7 |
| --- | --- | --- | --- | --- | --- |
| PA66 | | | 50% | 48% | 46% |
| Glass fiber | | | 50% | 50% | 50% |
| Prepolymer PA6T/6I η-rel. 1.14 | | | | 2% | 4% |
| Total | | | 100% | 100% | 100% |
| Prepolymer fraction referred to polyamide | | | 0% | 4% | 8% |
| Properties | Standard | Unit | | | |
| Flow path | EMS | mm | 172 | 221 | 271 |
| Gloss 20° | DIN 67530 | — | | 23 | 30 | 34 |
| Gloss 60° | DIN 67530 | — | | 53 | 60 | 71 |
| MVI 290° C./5 kg | ISO 1133 | cm$^3$/10 min | 21 | 37 | 43 |
| η-rel. 0.5% m-cresol | DIN 53727 | — | | 1.89 | 1.75 | 1.65 |
| Impact strength | ISO 179 | kJ/m$^2$ | 84 | 90 | 92 |
| Notched bar impact strength | ISO 179 | kJ/m$^2$ | 12 | 12 | 12 |
| Tear Resistance | ISO 527 | MPa | 220 | 235 | 240 |
| Elongation at tear | ISO 527 | % | 3.6 | 3.1 | 2.9 |
| Modulus of elasticity in extension | ISO 527 | MPa | 16000 | 16100 | 16200 |
| HDT A | ISO 75 | °C. | 250 | 255 | 255 |
| HDT C | ISO 75 | °C. | 220 | 220 | 225 |

TABLE 3

| Formulation of examples | | | 8 | 9 | 10 |
|---|---|---|---|---|---|
| PA 12 | | | 50% | 48% | 46% |
| Glass fiber | | | 50% | 50% | 50% |
| Prepolymer PA 12 η-rel. 1.10 | | | | 2% | 4% |
| Total | | | 100% | 100% | 100% |
| Prepolymer fraction referred to polyamide | | | 0% | 4% | 8% |
| Properties | Standard | Unit | | | |
| Flow path | EMS | mm | 161 | 212 | 276 |
| Gloss 20° | DIN 67530 | — | 21 | 24 | 33 |
| Gloss 60° | DIN 67530 | — | 57 | 66 | 72 |
| MVI 290° C./5 kg | ISO 1133 | cm³/10 min | 29 | 180 | 325 |
| η-rel. 0.5% m-cresol | DIN 53727 | — | 1.87 | 1.71 | 1.63 |
| Impact strength | ISO 179 | kJ/m² | 62 | 64 | 60 |
| Notched bar impact strength | ISO 179 | kJ/m² | 16 | 16 | 16 |
| Tear Resistance | ISO 527 | MPa | 144 | 149 | 151 |
| Elongation at tear | ISO 527 | % | 3.3 | 3.1 | 2.7 |
| Modulus of elasticity in extension | ISO 527 | MPa | 11900 | 12100 | 12300 |
| HDT A | ISO 75 | °C. | 169 | 169 | 169 |
| HDT C | ISO 75 | °C. | 133 | 135 | 135 |

TABLE 4

| Formulation of examples | | | 11 | 12 | 13 | 14 |
|---|---|---|---|---|---|---|
| PA 12 | | | 100% | 98% | | |
| PA MACM12 | | | | | 100% | 96% |
| Prepolymer PA 12 η-rel. 1.10 | | | | 2% | | 4% |
| Total | | | 100% | 100% | 100% | 100% |
| Properties | Standard | Unit | | | | |
| Flow path | EMS | mm | 250 | 270 | 140 | 172 |
| Gloss 20° | DIN 67530 | — | 78 | 81 | 114 | 116 |
| Gloss 60° | DIN 67530 | — | 90 | 91 | 129 | 130 |
| MVI 290° C/5 kg | ISO 1133 | cm³/10 min | 173 | 420 | 42 | 212 |
| η-rel. 0.5% m-cresol | DIN 53727 | — | 1.86 | 1.82 | 1.84 | 1.70 |
| Impact strength | ISO 179 | kJ/m² | o.B. | o.B. | o.B. | o.B. |
| Notched bar impact strength | ISO 179 | kJ/m² | 5 | 5.2 | 13 | 13 |
| Tear Resistance | ISO 527 | Mpa | 45 | 47 | 45 | 46 |
| Elongation at tear | ISO 527 | % | 300 | 310 | 150 | 162 |
| Modulus of elasticity in extension | ISO 527 | Mpa | 1450 | 1590 | 1600 | 1650 |
| HDT A | ISO 75 | °C. | 47 | 50 | 115 | 116 |

What is claimed is:

1. Polyamide molding compositions without impact strength modifier, with good surface quality and good flow behavior, comprising prepolymeric polyamides with a solution viscosity of $\mu_{rel}$ 1.01–1.30 (measured in 0.5% m-cresol) in quantities from 2–16 wt. % and 1–95 wt. % fillers, wherein the fillers are inorganic, metallic or polymeric fibers, spheres, laminae, powders or mixtures thereof.

2. Polyamide molding compositions according to claim 1, wherein the prepolymeric polyamides are of the same kind as the polyamide molding compositions.

3. Polyamide molding compositions according to claim 1, wherein the prepolymeric polyamides are of a different kind than the polyamide molding compositions.

4. Polyamide molding compositions according to claim 1, wherein the prepolymeric polyamides are selected from PA 6, PA 66, PA 6I/6T, PA 6T/6I, PA 6T/66, PA 6/6T, PA 6T/6I/66, PA 6I/66, PA MACMT/6I or mixtures thereof.

5. Polyamide molding compositions according to claim 1, wherein the prepolymeric polyamides are selected from PA 12, PA 612, PA 912, PA 1012, PA 1212, PA 610, PA 12/6T, PA 8T, PA 9T, PA 12T, PA N12, PA NI/6T or mixtures thereof.

6. Polyamide molding compositions according to claim 1, wherein the prepolymeric polyamides are selected from PA MACM I, PA MACM10, PA MACM 12, PA PACM 12, PA PACP 12, PA MXD6, PA MXDI, PA MACMT, PA 12/MACMI, PA 12/MACMT, PA 12/MACMI, PA NDT, PA NDI, PA IPDI/IPDT, PA TMHMDA, T and PA 12/PACM, T/PACM,I or mixtures thereof.

7. Polyamide molding compositions according to claim 1, comprising further additives such as chain regulators, stabilizers, crystallizing agents, softeners, dyes, pigments, antioxidants and the like additives, but no impact strength modifiers or flameproofing agents.

8. Method for the preparation of polyamide molding compositions according to claim 1, wherein prepolymeric polyamides of given viscosities from 0.1 to 20 wt. % of the polyamide matrix are added to the polyamide molding compositions in the melt or by compounding.

9. Method according to claim 8, wherein the molding compositions are not subjected to a separate stage of postcondensation.

10. A molding selected from the group consisting of:
fibers, sheets, pipes, hollow bodies or other half-finished or finished products, formed from the polyamide molding composition according to claim 1.

11. A filled molding formed from the polyamide molding composition according to claim 1.